(12) United States Patent
Wells et al.

(10) Patent No.: US 11,565,400 B2
(45) Date of Patent: Jan. 31, 2023

(54) ROBOT BASE ASSEMBLIES

(71) Applicant: Toyota Motor Engineering & Manufacturing North America, Inc., Plano, TX (US)

(72) Inventors: Keith J. Wells, Evansville, IN (US); Shigeo Akiyama, Lexington, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 166 days.

(21) Appl. No.: 17/177,857

(22) Filed: Feb. 17, 2021

(65) Prior Publication Data

US 2022/0258329 A1   Aug. 18, 2022

(51) Int. Cl.
*B25J 9/10* (2006.01)
*B25J 9/00* (2006.01)
*B25J 15/00* (2006.01)
*B25J 9/14* (2006.01)

(52) U.S. Cl.
CPC ............. *B25J 9/0009* (2013.01); *B25J 9/144* (2013.01); *B25J 15/0028* (2013.01)

(58) Field of Classification Search
CPC ....... B25J 9/0009; B25J 9/144; B25J 15/0028
See application file for complete search history.

(56) References Cited

U.S. PATENT DOCUMENTS

| 9,200,972 | B2 | 12/2015 | Inoue |
| 2018/0333215 | A1* | 11/2018 | Timm .................... B62B 3/02 |
| 2019/0105779 | A1 | 4/2019 | Einav |
| 2020/0108508 | A1 | 4/2020 | Hammar et al. |

FOREIGN PATENT DOCUMENTS

| CN | 209533388 U | 10/2019 |
| KR | 101359968 B1 | 2/2014 |
| KR | 20200034206 A | 3/2020 |

* cited by examiner

*Primary Examiner* — Randell J Krug
(74) *Attorney, Agent, or Firm* — Dinsmore & Shohl LLP

(57) ABSTRACT

A robot base assembly that supports a robot assembly above a floor. The robot assembly engages with a work piece having a locating component. The robot base assembly includes a base plate coupled to the floor, a support member slidably coupled to the base plate for linear displacement, a clamp assembly coupled to the support member, and a lock mechanism. The clamp assembly is movable between an engaged state and a disengaged state. In the engaged state the clamp assembly engages with the locating component. The lock mechanism is movable between a locked state and an unlocked state. In the locked state the support member is inhibited from linear displacement, and in the unlocked state the support member is permitted for linear displacement. The lock mechanism switches from the unlocked state to the locked state in response to the clamp assembly moving from the disengaged state to the engaged state.

14 Claims, 5 Drawing Sheets

ROBOT BASE ASSEMBLIES

TECHNICAL FIELD

The present specification generally relates to a robot base assembly and, more specifically, a robot base assembly for locating a work piece relative to a robotic arm supported by the robot base assembly.

BACKGROUND

It is known to use vision guided systems to locate a work piece relative to a robotic arm. Specifically, these vision guided systems use vision systems that calculate a distance between the work piece and the robotic arm. The robotic arm compensates for a difference in distance by adjusting the robotic arm movements. However, these systems include drawbacks such as requiring additional training for manufacturing workers to use the vision systems. Additionally, these systems can increase downtime of the manufacturing line when the camera or sensor used with the system is obscured.

Accordingly, a need exists for robot base assemblies that locate a robotic arm relative to a work piece without the need of complicated vision guided systems.

SUMMARY

In accordance with one embodiment, a robot base assembly is provided. The robot base assembly supports a robot assembly above a floor. The robot assembly engages with a work piece having a locating component. The robot base assembly includes a base plate coupled to the floor, a support member slidably coupled to the base plate for linear displacement, a clamp assembly coupled to the support member, and a lock mechanism. The clamp assembly is movable between an engaged state and a disengaged state. In the engaged state the clamp assembly engages with the locating component. The lock mechanism is movable between a locked state and an unlocked state. In the locked state the support member is inhibited from linear displacement, and in the unlocked state the support member is permitted for linear displacement. The lock mechanism switches from the unlocked state to the locked state in response to the clamp assembly moving from the disengaged state to the engaged state.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
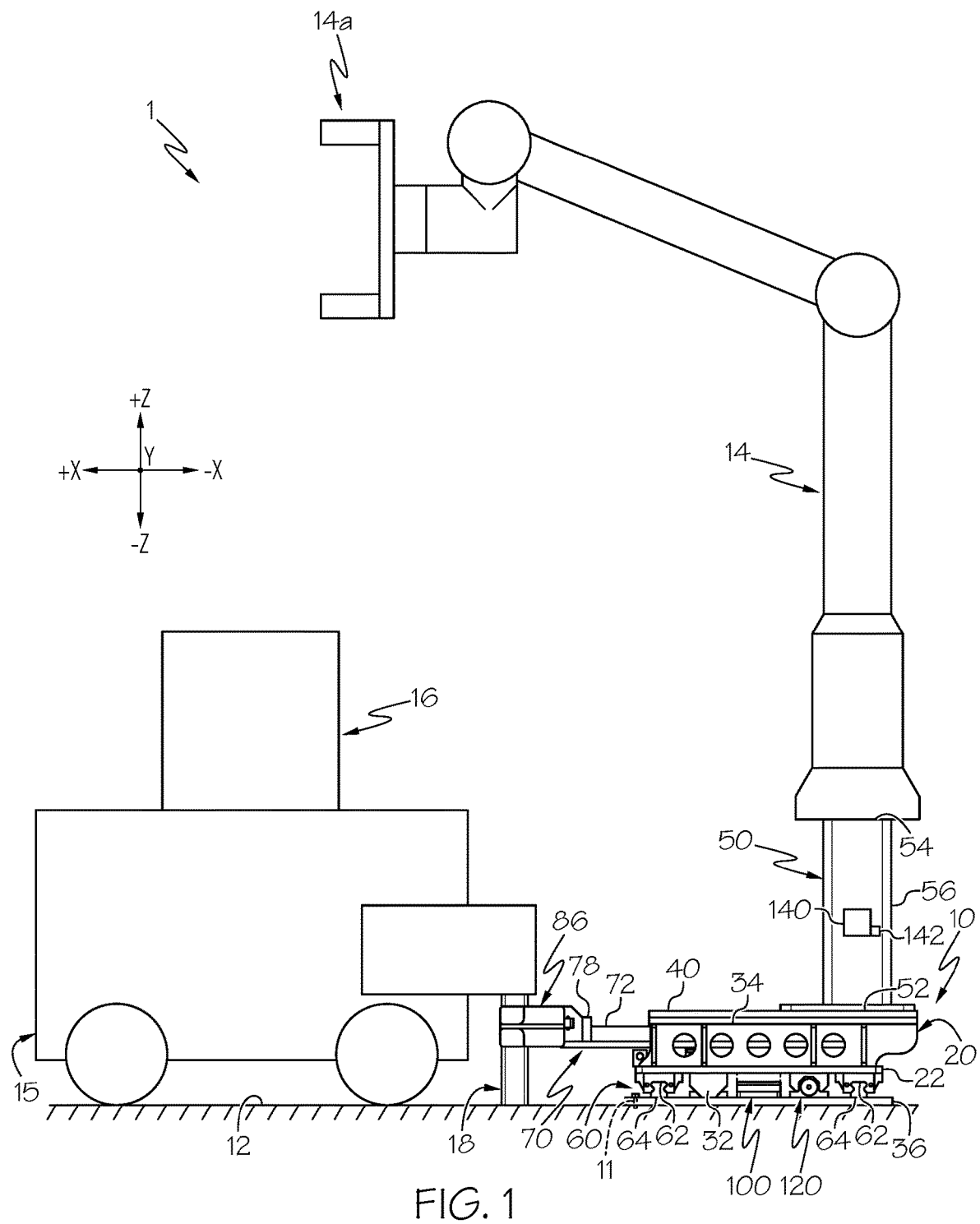
FIG. 1 schematically depicts a side view of a robot base assembly and an automated guided vehicle carrying a work piece, the robot base assembly including a clamp assembly in an engaged state, according to one or more embodiments shown and described herein.

The present disclosure is directed to a robot base assembly for a robotic arm that mechanically locates the robotic arm with respect to a work piece. The robot base assembly may locate the robotic arm relative to the work piece via a locating component. In some embodiments, the locating component may be coupled to the work piece. For example, the locating component may be a part of the work piece or may be directly or indirectly coupled to the work piece. In some embodiments, the locating component is coupled to a transport assembly 15 that the work piece is positioned upon. The transport assembly may be a cart, a trolley, an automated guided vehicle (AGV), or any other known apparatus for transporting work pieces in a manufacturing environment.

In some embodiments, the work piece is provided on the AGV which includes a guidance system that maneuvers the AGV through the manufacturing environment. The guidance system may include an autonomous vision system, a magnetic sensor that follows a magnetic strip on the floor of the manufacturing environment, or any other applicable method. The AGV carries the work piece for the robot assembly to work on. In some embodiments, the AGV may include a cart body and a locating component coupled to the cart body. During the manufacturing process, the AGV drives into a robot station that includes the robot base assembly. When the AGV arrives, the robot base assembly mechanically couples to the locating component on the AGV, thereby locating the robotic arm relative to the AGV and the work piece.

As used herein, the term "assembly longitudinal direction" refers to the forward-rearward direction of the assembly (i.e., in the +/−X direction). The term "assembly lateral direction" refers to the cross-direction (i.e., in the +/−Y direction depicted in FIG. 2), and is transverse to the assembly longitudinal direction. The term "assembly vertical direction" refers to the upward-downward direction of the assembly (i.e., in the +/−Z direction depicted in FIG. 2). As used herein, "upper" or "top" is defined as the positive Z direction of the coordinate axis shown in the drawings. "Lower" or "bottom" is defined as the negative Z direction of the coordinate axis shown in the drawings.

FIG. 1 generally depicts one embodiment of a robot station 1 that includes a robot base assembly 10 for locating a robotic arm 14 relative to a work piece 16 to allow for a tool 14a of the robotic arm 14 to conduct an operation on the work piece 16. The robot base assembly 10 is configured to support the robotic arm 14 above a floor 12. The robot base assembly 10 includes a support member 20, a base plate 36, a slide assembly 60 coupling the support member 20 to the base plate 36, a clamp assembly 70 for clamping the robot base assembly 10 to the work piece 16, a lock mechanism 100 for restricting movement of the base plate 36 relative to the support member 20, and a centering mechanism 120. Various embodiments of the robot base assembly 10 and the operation of the robot base assembly 10 will be described in more detail herein.

Figure 2:
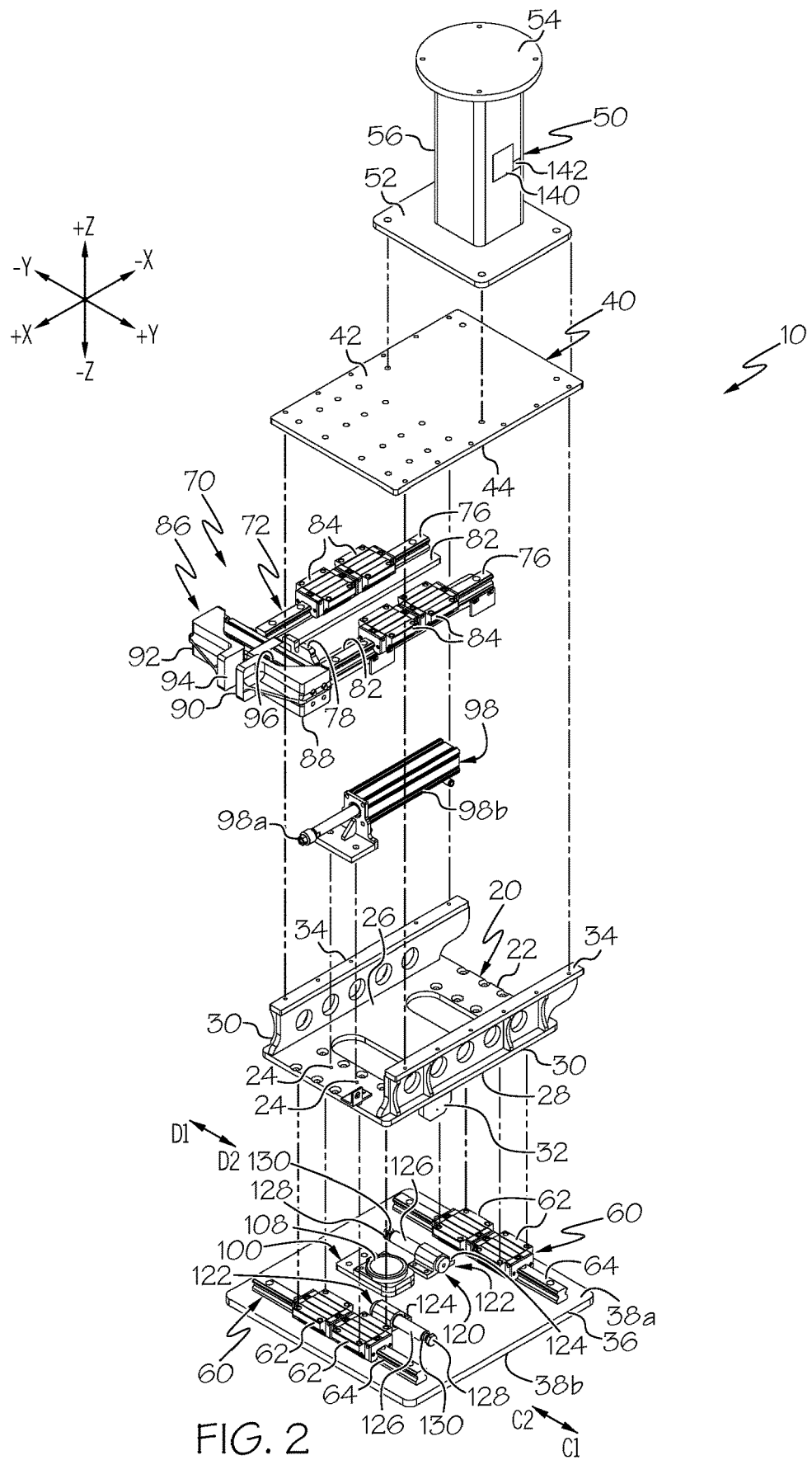
FIG. 2 schematically depicts an exploded view of the robot base assembly of FIG. 1, according to one or more embodiments shown and described herein.
Figure 3:
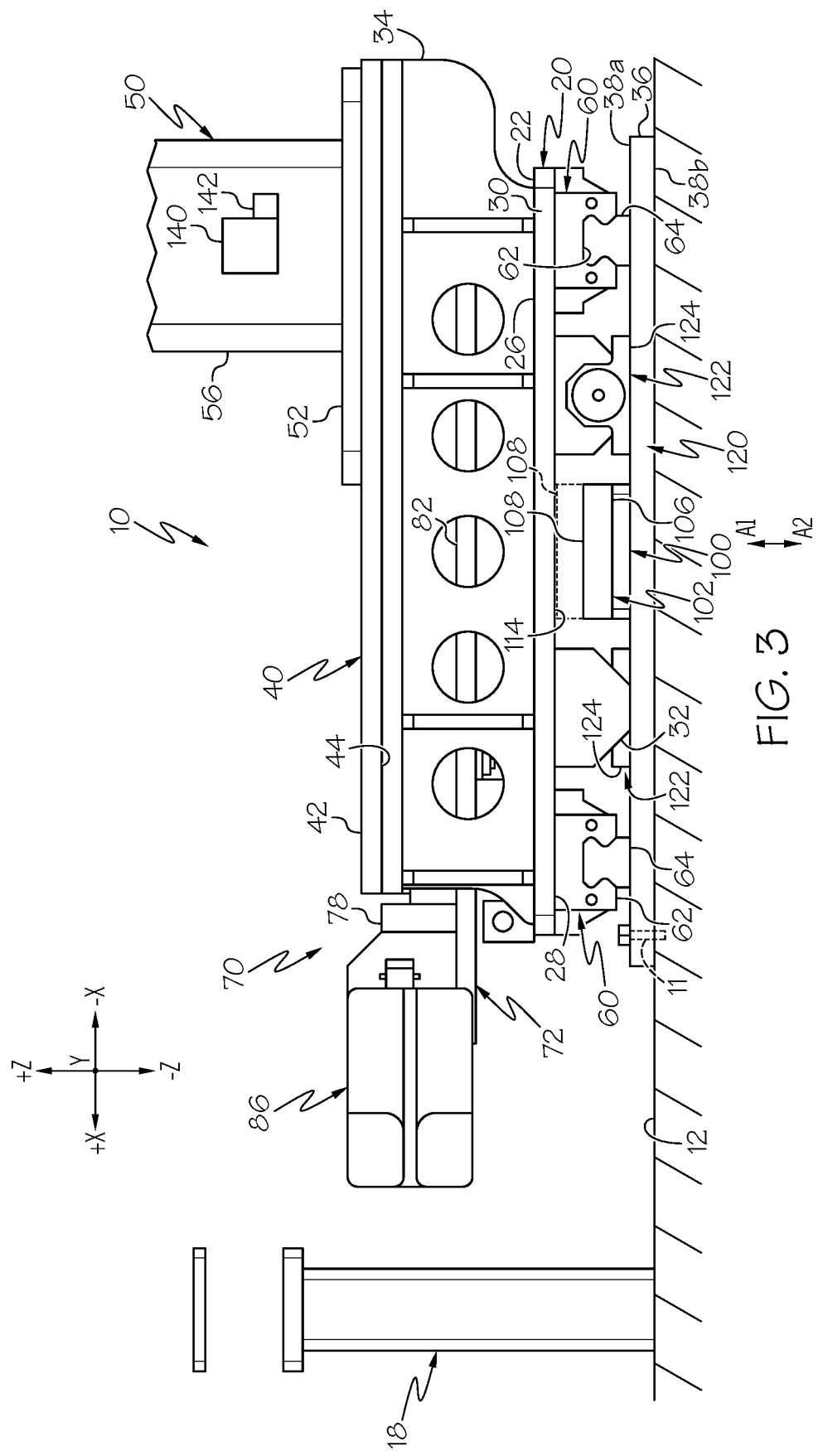
FIG. 3 schematically depicts a partial side view of the robot base assembly of FIG. 1 with the clamp assembly in a disengaged state, according to one or more embodiments shown and described herein.

Referring now to FIGS. 1-3, the support member 20 may include a lower plate 22, an upper plate 40, and a pair of side walls 34 that extend between the lower plate 22 and the upper plate 40. The base plate 36 includes a top surface 38*a* and an opposite bottom surface 38*b*. The lower plate 22 is slidably coupled to base plate 36 by the slide assembly 60. The base plate 36 includes a top surface 38*a* and an opposite bottom surface 38*b*. In some embodiments, the base plate 36 may be coupled to the floor 12 by at least one fastener 11, as shown in FIGS. 1 and 3, such that the bottom surface 38*b* contacts the floor 12. The at least one fastener 11 securely fixes the base plate 36, and consequently the robot base assembly 10, to the floor 12.

The lower plate 22 includes a top surface 26, a bottom surface 28, a pair of side edges 30, and a pair of lower projections 32 extending from the bottom surface 28 in the downward direction (i.e., in the −Z direction). Each of the pair of lower projections 32 are provided on one of the pair of side edges 30. The pair of lower projections 32 may be offset, such that one of the pair of lower projections 32 is offset longitudinally (i.e., in the +/−X direction) from the other of the pair of lower projections 32. In embodiments, the pair of lower projections 32 may be aligned longitudinally (i.e., in the +/−X direction).

The upper plate 40 includes an upper surface 42 and an opposite lower surface 44, the lower surface 44 being coupled to the pair of side walls 34. A pedestal 50 includes a lower platform 52, an upper platform 54, and a column 56 extending between the lower platform 52 and the upper platform 54. The pedestal 50 is configured to mount the robotic arm 14 to the robot base assembly 10. Specifically, the robotic arm 14 is mounted to the upper platform 54 and the lower platform 52 is mounted to the upper surface 42 of the upper plate 40. In some embodiments, the robotic arm 14 may be coupled directly to the upper plate 40. In some embodiments, the robotic arm 14 may be coupled directly to the support member 20.

Still referring to FIGS. 1-3, the slide assembly 60 includes a parallel pair of upper slide bearings 62 and a parallel pair of lower slide rails 64. The pair of upper slide bearings 62 are coupled to the support member 20, specifically, the bottom surface 28 of the lower plate 22. The pair of lower slide rails 64 are coupled to the top surface 38*a* of the base plate 36. The pair of upper slide bearings 62 are slidably coupled to the pair of lower slide rails 64, thereby coupling the support member 20 to the base plate 36. The pair of upper slide bearings 62 and the pair of lower slide rails 64 are oriented such that the support member 20 is slidable in the assembly lateral direction (i.e., in the +/−Y direction).

In some embodiments, the pair of upper slide bearings 62 are linear bearings, such as machine slides, roller slides, dovetail slides, compound slides, and rack slides. In some embodiments, the slide assembly 60 includes a single upper slide bearing 62 and a single corresponding lower slide rail 64. In some other embodiments, the slide assembly 60 includes three or more upper slide bearings 62 and a corresponding number of lower slide rails 64.

Still referring to FIGS. 1-3, the clamp assembly 70 includes a clamp arm 72, a gripper 86, and an actuator 98. The clamp arm 72 includes a pair of longitudinal projections 82, a vertical projection 78, and a pair of slide rails 76. The pair of longitudinal projections 82 are coupled to the pair of slide rails 76. A pair of upper slide bearings 84 are coupled to the lower surface 44 of the upper plate 40. The pair of slide rails 76 are slidably coupled to the pair of upper slide bearings 84. In some embodiments, the pair of slide bearings 84 are linear bearings, such as machine slides, roller slides, dovetail slides, compound slides, and rack slides. In some embodiments, the clamp arm 72 includes a single lower slide rail 76 and corresponding upper slide bearing 84.

Figure 4A:
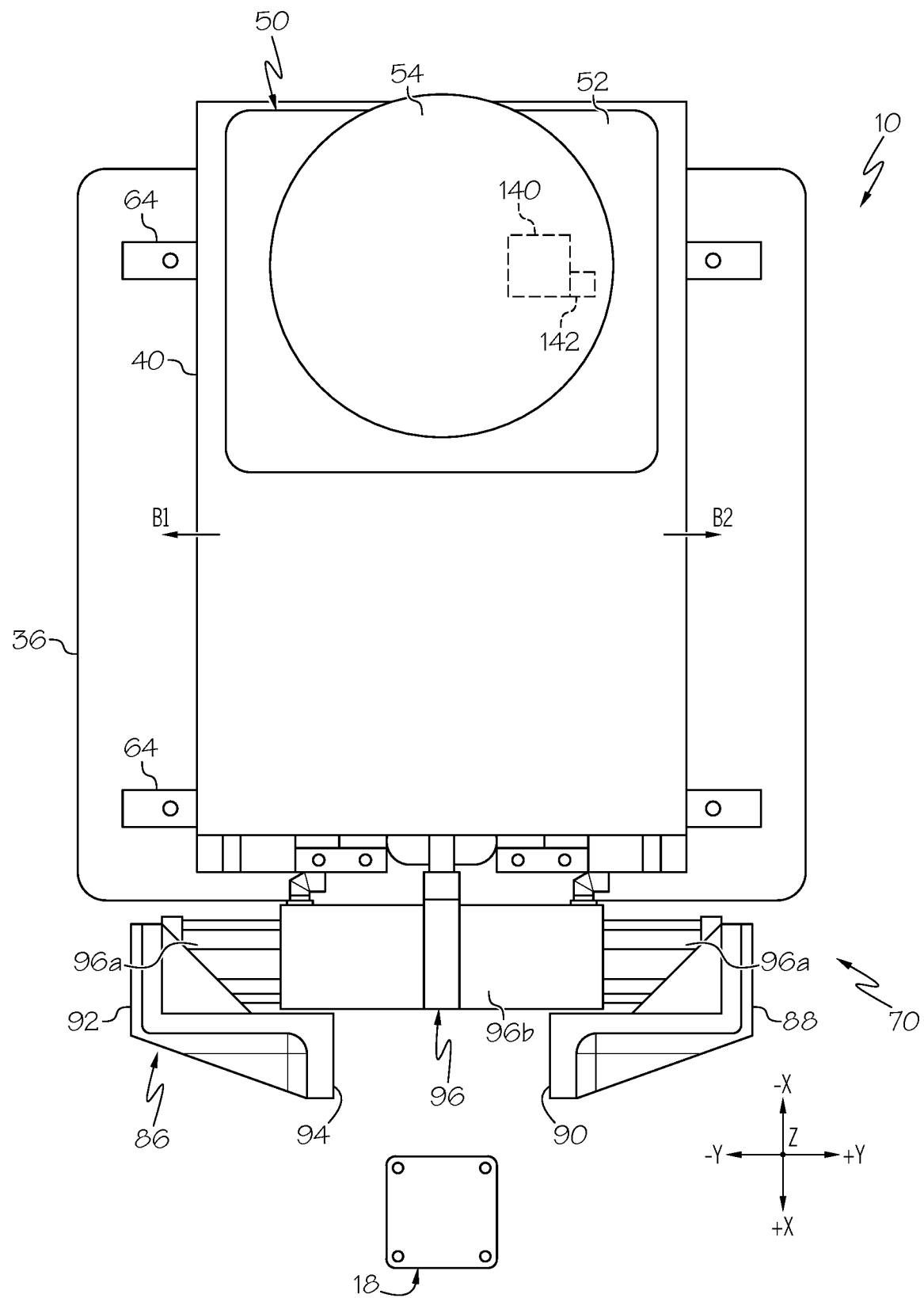
FIG. 4A schematically depicts a top view of the robot base assembly of FIG. 1 with the clamp assembly in the disengaged state with a gripper in a disconnected position, according to one or more embodiments shown and described herein.
Figure 4B:
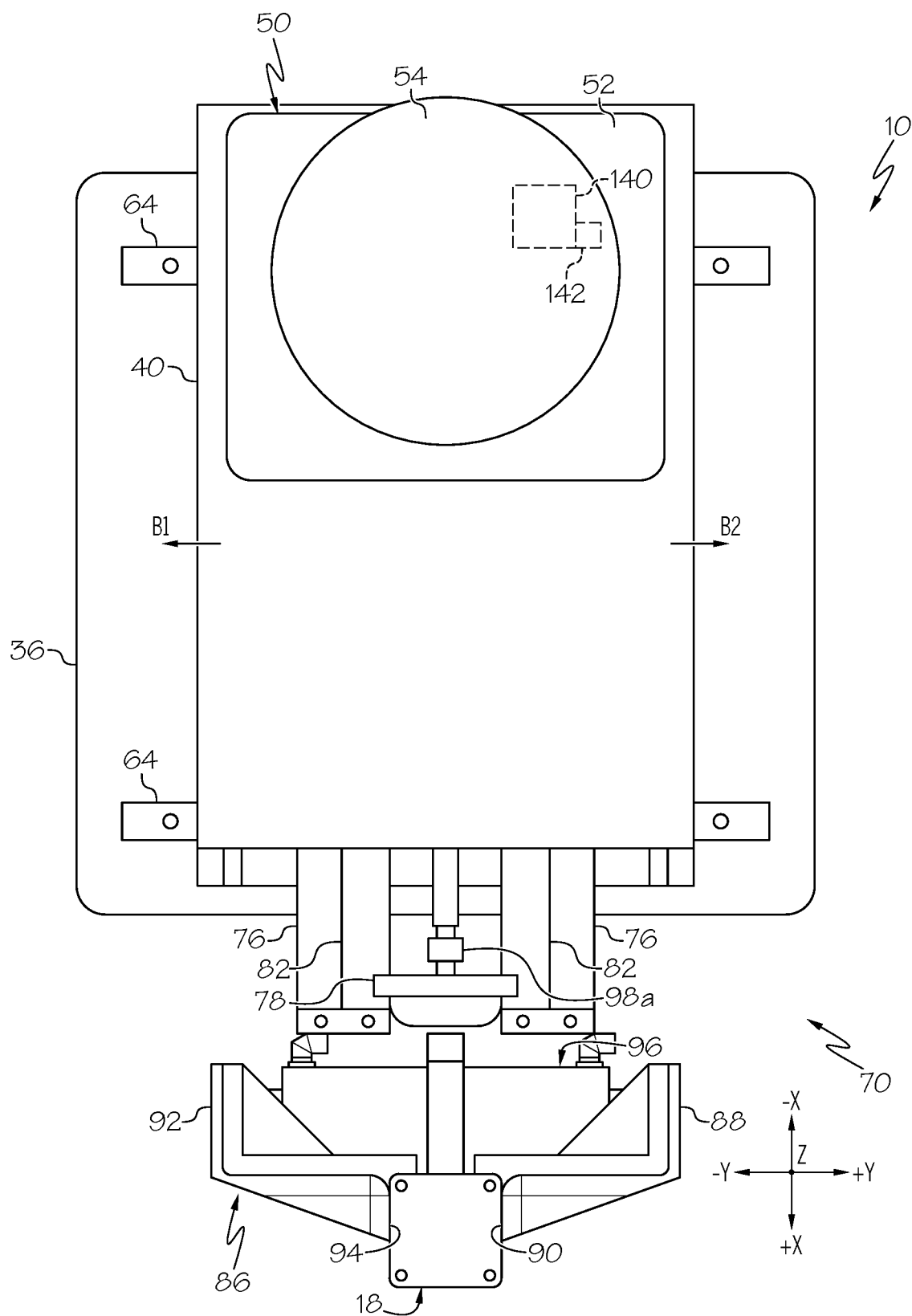
FIG. 4B schematically depicts a top view of the robot base assembly of FIG. 1 with the clamp assembly in an engaged state with the gripper in a connected position, according to one or more embodiments shown and described herein.

The actuator 98 includes an actuator arm 98*a* and an actuator body 98*b*. The actuator body 98*b* is coupled to the support member 20. In some embodiments, the actuator body 98*b* is coupled to the mounting holes 24 of the lower plate 22. The actuator 98 is positioned between the pair of longitudinal projections 82 and a distal end of the actuator arm 98*a* is coupled to the vertical projection 78. The actuator 98 is configured to move, that is linearly display, the actuator arm 98*a* with respect to the actuator body 98*b* to move the clamp arm 72 between a retracted position (FIG. 4A) and an extended position (FIG. 4B) through the connection with the vertical projection 78. The clamp arm 72 moves in the −X direction when moving from the extended position (FIG. 4B) to the retracted position (FIG. 4A). the clamp arm 72 moves in the +X direction when moving form the retracted position (FIG. 4A) to the extended position (FIG. 4B). Referring to FIGS. 4A and 4B, a distance between the gripper 86 and the support member 20 in the retracted position is less than a distance between the gripper 86 and the support member 20 in the extended position. In embodiments, the actuator 98 may be a linear actuator, a solenoid, a pneumatic cylinder, or a hydraulic cylinder.

Still referring to FIGS. 4A and 4B, the gripper 86 includes a left grip 88 and a right grip 92. The left grip 88 includes a clamping surface 90. The right grip 92 includes a clamping surface 94. An actuator 96 is coupled between the left grip 88 and right grip 92. The actuator 96 includes a pair of actuator arms 96*a* and an actuator body 96*b*. A distal end of one of the pair of actuator arms 96*a* is coupled to the left grip and a distal end of the other of the pair of actuator arms 96*a* is coupled to the right grip 92. The actuator 96 is configured to move, that is linearly displace, the left grip 88 and the right grip 92 with respect to each other.

The actuator 96 is configured to move, that is linearly displace, the gripper 86 laterally (i.e., in the +/− Y direction), between a disconnected position (FIG. 4A), and a connected position (FIG. 4B). Referring to FIG. 4A, in the disconnected position, the left grip 88 is positioned spaced apart from the locating component 18 and the right grip 92 is positioned spaced apart from the locating component 18 such that the clamping surface 90 and the clamping surface 94 are spaced apart and not in contact with the locating component 18. Referring to FIG. 4B, in the connected position, the clamping surface 90 of the left grip 88 and the clamping surface 94 of the right grip 92 are in contact with the locating component 18.

In some embodiments, the actuator 96 is a dual actuator in which each of the actuator arms 96*a* are movable independently. In some other embodiments, the actuator 96 is a single actuator in which the actuator arms 96*a* are not configured to move independently from each other. In some embodiments, the gripper 86 may include a moveable grip and a fixed grip, where the actuator 96 only drives the moveable grip. Specifically, the actuator 96 may be coupled to one of the left grip 88 and the right grip 92, where the other of the left grip 88 and right grip 92 is fixed. In embodiments, the actuator 96 may be a linear actuator, a solenoid, a pneumatic cylinder, or a hydraulic cylinder.

The clamp assembly 70 includes a disengaged state and an engaged state. The clamp assembly 70 is in the disengaged state when the clamp arm 72 is in the retracted position and the gripper 86 is in the disconnected position. The clamp assembly 70 is in the engaged state when the clamp arm 72 is in the extended position and the gripper 86 is in the connected position. In the engaged state, the clamp assembly 70 is in contact with the locating component 18.

Referring to FIGS. 2-3, the lock mechanism 100 includes a body 102, an engagement portion 108, and an actuator 106. The actuator 106 couples the engagement portion 108 to the body 102 for movement in the direction of arrows A1 and A2. A receiving portion 114 is positioned on, or formed within, the lower plate 22 of the support member 20, and is positioned opposite the lock mechanism 100, specifically, the engagement portion 108. The body 102 is coupled to the top surface 38a of the base plate 36. The actuator 106 moves the engagement portion 108 in the direction of arrow A1 from an unlocked position to a locked position (shown in phantom in FIG. 3) and from the locked position to the unlocked position in the direction of arrow A2. In embodiments, the actuator 106 may be a linear actuator, a solenoid, a pneumatic cylinder, or a hydraulic cylinder.

The lock mechanism 100 is movable between a locked state and an unlocked state. In the unlocked state, the engagement portion 108 is in the unlocked position, where the engagement portion 108 is spaced apart from the receiving portion 114. In the unlocked state, the support member 20 is permitted to move with respect to the base plate 36. Specifically, in the unlocked state, the support member 20 is permitted to slide with respect to the base plate 36 in the direction of arrows B1 and B2 as shown in FIGS. 4A and 4B

In the locked state, the engagement portion 108 is in the locked position, where the engagement portion 108 contacts the receiving portion 114 (shown in phantom), such that the contact between the engagement portion 108 and the support member 20 inhibits the support member 20 from moving with respect to the base plate 36. In the locked position, the engagement portion 108 may be positioned within the receiving portion 114. In some embodiments, the lock mechanism 100 is coupled to the support member 20, where the receiving portion 114 is positioned on, or formed within, the top surface 38a of the base plate 36 in the locked state. In embodiments, the lock mechanism 100 is coupled to the support member 20 and the receiving portion 114 is positioned on/within the base plate 36.

Referring to FIGS. 1-3, the centering mechanism 120 includes a pair of biasing members 122. Each of the pair of biasing members 122 includes a bracket 124, an elongated body 126 having a platform 128, and a biasing element 130. Each bracket 124 includes a bore formed therein. Each bracket 124 is coupled to the top surface 38a of the base plate 36. The elongated body 126 is positioned within and is coupled to the bore of the bracket 124, with the elongated body 126 extending laterally (i.e., in the +/−Y direction) from the bracket 124. The biasing element 130 may be a spring, a resilient member, or a magnet.

The platform 128 is coupled to portion of the elongated body 126. The biasing element 130 is coupled between the elongated body 126 and bracket 124. The biasing element 130 biases the elongated body 126 outwardly in the lateral direction (i.e., +/−Y direction). As shown in FIG. 2, one of the biasing members 122 is configured such that the biasing element 130 biases the elongated body 126 in the direction of arrow C1 and the other of the biasing members 122 is configured such that the biasing element 130 biases the elongated body 126 in the direction of arrow D1.

The centering mechanism 120 extends in the assembly lateral direction (i.e., +/−Y direction), with each of the pair of biasing members 122 extending in opposing directions. Each of the platforms 128 are configured to contact the set of lower projections 32 of the support member 20, where the centering mechanism 120 applies opposing biasing forces to the support member 20, thereby biasing the support member 20 to an initial position.

The initial position is a predetermined position where the support member 20 rests relative to the base plate 36 when no forces are acting on the robot base assembly 10. The initial position may be adjusted by moving the position of the centering mechanism 120. In some embodiments, the centering mechanism 120 includes a single biasing member 122.

Referring to FIG. 4A, when the work piece 16 enters the robot station 1, the clamp assembly 70 is in the disengaged state, where the robot base assembly 10 has the clamp arm 72 in the retracted position, and the gripper 86 in the disconnected position. The lock mechanism 100 may be in the unlocked state or the locked state when the work piece 16 enters the robot station. Referring to FIG. 3, when the lock mechanism 100 is in the locked state, the actuator 106 is actuated to switch the lock mechanism 100 from the locked state (shown in phantom) to the unlocked state. Specifically, the actuator 106 is actuated to move the engagement portion 108 from the locked position to the unlocked position.

Referring to FIG. 4A, once the work piece 16 is in the robot station 1 and the lock mechanism 100 is in the unlocked state, the clamp assembly 70 moves from the disengaged state to the engaged state. Specifically, actuator 98 is actuated to move the clamp arm 72 from the retracted position to the extended position (FIG. 4B). Once the clamp arm 72 is in the extended position, actuator 96 is actuated to move the gripper 86 from the disconnected position to the connected position (FIG. 4B), where the clamping surface 90 of the left grip 88 and the clamping surface 94 of the right grip 92 are in contact with the locating component 18 of the work piece 16.

During clamping of the gripper 86 onto the locating component 18, the support member 20 slides on the slide assembly 60 in the direction of either of arrows B1 and B2 as shown in FIGS. 4A and 4B from the initial position to a displaced position. In the displaced position, the support member 20 is linearly displaced along the lower slide rails 64 in the direction of arrow B1 or in the direction of arrow B2 to locate the robotic arm 14 in a predetermined position relative to the work piece 16. Specifically, the movement of the gripper 86 from the disconnected position to the connected position overcomes the biasing force of at least one of the biasing elements 130 of one of the biasing members 122 such that the elongated body 126 is biased in the direction of either arrow C2 or D2 due to the contact between the projections 32 and the platform 128. For example, when the support member 20 slides in the direction of arrow B1, the biasing force of the biasing element 130 of the right side biasing member 122 of FIG. 2 is overcome and the elongated body 126 is moved in the direction of arrow C2. When the support member 20 slides in the direction of arrow B2 the biasing element 130 of the biasing force of the left side biasing member 122 of FIG. 2 is overcome and the elongated body 126 is moved in the direction of arrow D2.

Once the clamp assembly 70 is in the engaged state, actuator 106 is actuated to move the lock mechanism 100 from the unlocked state to the locked state (shown in phantom in FIG. 3), where the engagement portion is in the locked position. When in the locked state, the robotic arm 14 may proceed with operating such that the tool 14a conducts a manufacturing process on the work piece 16. In some embodiments, the tool 14a may be a tool for torqueing a fastener into the work piece 16. The locked state additionally inhibits any vibrations and movements caused by the manufacturing process from moving the robot arm 14 and the tool 14a with respect to the work piece 16.

When the tool 14a on the robotic arm 14 completes manufacturing processes, actuator 106 is actuated to move the lock mechanism 100 into the unlocked state (FIG. 3). Further, actuator 96 is actuated to move the gripper 86 from the connected position to the disconnected position, releasing the locating component 18. The actuator 98 is actuated to move the clamp arm 72 from the extended position (FIG. 4B) to the retracted position (FIG. 4A), thereby placing the clamp assembly 70 in the disengaged state. Upon the gripper 86 moving to the disconnected position or the movement of the claim arm 72 from the extend position to the retracted position, the contact between the clamping surface 90 of the left grip 88 and the clamping surface 94 of the right grip 92 with the locating component 18 of the work piece 16 is released and the biasing force of the biasing elements 122 of the centering mechanism 120 allows the centering mechanism 120 to move from the displaced position to the initial position.

Specifically, in the case in which the support member 20 was moved from the initial positon to the displaced positon in the direction of arrow B1, the biasing force of the biasing element 130 of the right side biasing member 122 biases the elongated body 126 in the direction of arrow C1, due to the contact between the platform 128 and the projection 32, so as to move the support member 20 in the direction of arrow B2 from the displaced position to the initial position.

Similarly, in the case in which the support member 20 was moved from the initial positon to the displaced positon in the direction of arrow B2, the biasing force of the biasing element 130 of the left side biasing member 122 biases the elongated body 126 in the direction of arrow D1, due to the contact between the platform 128 and the projection 32, so as to move the support member 20 in the direction of arrow B1 from the displaced position to the initial position.

In some embodiments, an electronic control unit (ECU) 140 is connected to each of the actuator 96, actuator 98, and actuator 106. The ECU 140 selectively activates each of the actuators 96, 98, and 106 in response to an input. The input may be sent from one of the actuators 96, 98, and 106, where the actuators 96, 98, and 106 indicate when the robot base assembly 10 is in a specific state, and send a corresponding signal to the ECU 140.

In some embodiments, the input is from a sensor 142, such as a proximity switch, where the input signal the ECU 140 to activate the actuators 96, 98, and 106. In some embodiments, the input from the sensor 142 indicates to the ECU 140 that the transport assembly 15 is in a predetermined position. The ECU 140 may then activate the actuators 96, 98, 106 accordingly. In some embodiments, the sensor 142 detects the presence of the work piece 16, the transport assembly 15, or both the work piece 16 and transport assembly 15, entering a predetermined position within the robot station 1. In response to the sensor 142 detecting the presence of the work piece 16 within the predetermined position, the ECU 140 actuates the actuator 106. Upon actuation of the actuator 106 to move the lock mechanism from the locked state to the unlocked state, the ECU 140 actuates the actuator 98 to move the clamp arm 72 from the retracted position to the extended position. The ECU 140 next actuates the actuator 106 to move the gripper from the disconnected position to the connected position upon completion of the movement of the clamp arm 72 from the retracted position to the extended position, upon movement of the clamp arm 72 a predetermined distance from the retracted position towards the extended positon, or upon a lapse of a predetermined time from when the actuator 98 was actuated to move the clamp arm 72 from the retracted position towards the extended position.

The ECU 140 may also receive a signal from the tool 14a or the robotic arm 14 that the manufacturing process is completed. Thereafter, the ECU 140 may actuate the actuator 106 to move the locking mechanism 100 from the locked state to the unlocked state, actuate the actuator 96 to move the gripper 86 from the connected state to the disconnected state and actuate the actuator 98 to move the clamp arm 72 from the extended position to the retracted positon either simultaneously, after a predetermined time period has lapsed from the completion of the manufacturing process and of each actuation of the proceeding actuator, or upon the movement of the gripper 86 and/or the clamp arm 72 a predetermined distance.

In some embodiments, the robot base assembly 10 does not include a base plate 36, where the support member 20 is slidably coupled directly to the floor 12. In such an embodiment, the pair of lower slide rails 64, the lock mechanism 100, and the centering mechanism 122 may be coupled directly or indirectly to the floor 12.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A robot base assembly that supports a robot assembly above a floor, the robot assembly engages with a work piece having a locating component, the robot base assembly comprising:
 a base plate coupled to the floor;
 a support member slidably coupled to the base plate for linear displacement;
 a clamp assembly coupled to the support member, the clamp assembly movable between an engaged state and a disengaged state, in the engaged state the clamp assembly engages with the locating component; and
 a lock mechanism movable between a locked state and an unlocked state, in the locked state the support member is inhibited from linear displacement, and in the unlocked state the support member is permitted for linear displacement, the lock mechanism switches from the unlocked state to the locked state in response to the clamp assembly moving from the disengaged state to the engaged state.

2. The robot base assembly of claim 1, wherein the lock mechanism switches from the locked state to the unlocked state in response to the clamp assembly moving from the engaged state to the disengaged state.

3. The robot base assembly of claim 2, wherein the movement of the clamp assembly from the disengaged state to the engaged state linearly displaces the support member from an initial position to a displaced position with respect to the base plate as the lock mechanism is in the unlocked state.

4. The robot base assembly of claim 3, further comprising a centering mechanism configured to linearly displace the support member from the displaced position to the initial positon when the lock mechanism is in the unlocked state.

5. The robot base assembly of claim 4, wherein the centering mechanism includes a biasing member positioned between the base plate and the support member, the biasing member biases the support member towards the initial position.

6. The robot base assembly of claim 5, wherein in the locked state the lock mechanism overcomes a biasing force of the biasing member to retain the support member in the displaced position, and upon switching of the lock mechanism from the locked state to the unlocked state the biasing force of the biasing member linearly displaces the support member from the displaced position to the initial position.

7. The robot base assembly of claim 4, wherein the centering mechanism includes a first biasing member and a second biasing member,
the first biasing member positioned between the base plate and the support member, the first biasing member biases the support member towards the initial position in a first direction, and
the second biasing member positioned between the base plate and the support member, the second biasing member biases the support member towards the initial position in a second direction opposite the first direction.

8. The robot base assembly of claim 4, wherein the lock mechanism includes an engagement portion and a receiving portion, the engagement portion is movably coupled to one of the base plate and the support member between a locked position and an unlocked position, the receiving portion is provided on the other one of the base plate and the support member, in the locked positon the engagement portion is engaged with the receiving portion to place the lock mechanism in the locked state, and in the unlocked position the engagement portion is disengaged with the receiving portion to place the lock mechanism in the unlocked state.

9. The robot base assembly of claim 8, wherein the lock mechanism includes an actuator coupled to the engagement portion, the actuator configured to move the engagement portion between the locked position and the unlocked position to move the lock mechanism between the locked state to the unlocked state.

10. The robot base assembly of claim 4, wherein the clamp assembly includes an arm slidably coupled to the support member for movement between a retracted position and an extended position in a direction generally normal to a direction of the linear displacement of the support member with respect to the base plate.

11. The robot base assembly of claim 10, wherein the clamp assembly includes a gripper provided at a distal end of the arm, the gripper movable between a connected position and a disconnected position, in the connected position the gripper is in contact with the locating component, and in the disconnected position the gripper is spaced apart from the locating component.

12. The robot base assembly of claim 11, wherein the clamp assembly is in the engaged state when the arm is in the extended position and the gripper is in the connected position.

13. The robot base assembly of claim 12, wherein movement of the gripper from the disconnected position to the connected position causes the support member to linearly displace from the initial position to the displaced position when the lock mechanism is in the unlocked state.

14. The robot base assembly of claim 13, wherein upon movement of the gripper from the connected position to the disconnected position and movement of the lock mechanism from the locked state to the unlocked state the centering mechanism linearly displaces the support member from the displaced position to the initial position.

* * * * *

UNITED STATES PATENT AND TRADEMARK OFFICE
CERTIFICATE OF CORRECTION

| | |
|---|---|
| PATENT NO. | : 11,565,400 B2 |
| APPLICATION NO. | : 17/177857 |
| DATED | : January 31, 2023 |
| INVENTOR(S) | : Keith J. Wells and Shigeo Akiyama |

It is certified that error appears in the above-identified patent and that said Letters Patent is hereby corrected as shown below:

In the Specification

In Column 7, Line(s) 30, after "initial", delete "positon" and insert --position--, therefor.

In Column 7, Line(s) 30, after "displaced", delete "positon" and insert --position--, therefor.

In Column 7, Line(s) 38, after "initial", delete "positon" and insert --position--, therefor.

In Column 7, Line(s) 38, after "displaced", delete "positon" and insert --position--, therefor.

In Column 8, Line(s) 8, delete "positon" and insert --position--, therefor.

In Column 8, Line(s) 19, delete "positon" and insert --position--, therefor.

In the Claims

In Column 9, Line(s) 7, Claim 4, delete "positon" and insert --position--, therefor.

In Column 9, Line(s) 38, Claim 8, delete "positon" and insert --position--, therefor.

Signed and Sealed this
Twenty-first Day of March, 2023

Katherine Kelly Vidal
*Director of the United States Patent and Trademark Office*